United States Patent
Park et al.

(10) Patent No.: US 9,394,187 B2
(45) Date of Patent: Jul. 19, 2016

(54) ELECTROLYSIS DEVICE INTEGRATING RECTIFIER

(75) Inventors: Kyu Won Park, Busan (KR); Yong Seok Park, Pyeongtaek-si (KR); Ik Hwan Lee, Asan-si (KR); Seong Tae Kim, Asan-si (KR); Hai Don Lee, Suwon-si (KR); Gwang Ho Lee, Pyeongtaek-si (KR); Young Min Kim, Asan-si (KR)

(73) Assignee: TECHCROSS CO., LTD., Seoul (KR)

( * ) Notice: Subject to any disclaimer, the term of this patent is extended or adjusted under 35 U.S.C. 154(b) by 402 days.

(21) Appl. No.: 13/997,570

(22) PCT Filed: Nov. 28, 2011

(86) PCT No.: PCT/KR2011/009112
§ 371 (c)(1),
(2), (4) Date: Oct. 24, 2013

(87) PCT Pub. No.: WO2012/086934
PCT Pub. Date: Jun. 28, 2012

(65) Prior Publication Data
US 2014/0042019 A1    Feb. 13, 2014

(30) Foreign Application Priority Data
Dec. 22, 2010 (KR) .................. 10-2010-0132335

(51) Int. Cl.
| C02F 1/461 | (2006.01) |
| C25B 15/02 | (2006.01) |
| C25B 9/04 | (2006.01) |
| B63J 4/00 | (2006.01) |
| C02F 1/467 | (2006.01) |
| C02F 103/00 | (2006.01) |

(52) U.S. Cl.
CPC .............. C02F 1/46104 (2013.01); B63J 4/002 (2013.01); C02F 1/4674 (2013.01); C25B 9/04 (2013.01); C25B 15/02 (2013.01);
(Continued)

(58) Field of Classification Search
CPC ......................................................... B63J 4/002
See application file for complete search history.

(56) References Cited

U.S. PATENT DOCUMENTS

| 2003/0051997 A1 | 3/2003 | Lin et al. |
| 2007/0056857 A1 | 3/2007 | Suzuki et al. |
| 2011/0303533 A1* | 12/2011 | Shyu ........................ C25B 9/00 204/274 |

FOREIGN PATENT DOCUMENTS

| EP | 1847513 A1 | 10/2007 |
| JP | 2001-174431 A | 6/2001 |

(Continued)

OTHER PUBLICATIONS

Supplementary European Search Report issued in corresponding application EP 11850494.3, Aug. 26, 2014, 2 pages.

*Primary Examiner* — Ciel Thomas
(74) *Attorney, Agent, or Firm* — Drinker Biddle & Reath LLP

(57) ABSTRACT

An electrolysis device with a rectifier comprises: an electrolytic cell; a joint panel with a first surface joined to the electrolytic cell; an electrode module comprising a housing, a plurality of electrodes provided inside the housing, and an auxiliary panel joined to a second surface of the joint panel, the auxiliary panel having a first end installed in the electrolytic cell and a second end perpendicularly protruding from an external periphery of a second end of the housing; a rectifier module having a second side surface from which an electrode protrudes; an L-shaped panel joined to second surface of the joint panel and any side surface of the rectifier module; and a bus bar that connects the electrode of the electrode module to the electrode of the rectifier module.

10 Claims, 5 Drawing Sheets

(52) U.S. Cl.
CPC .... *C02F 2103/008* (2013.01); *C02F 2201/007* (2013.01); *C02F 2201/4613* (2013.01); *C02F 2303/14* (2013.01)

(56) References Cited

FOREIGN PATENT DOCUMENTS

| | | |
|---|---|---|
| JP | 2003-89892 A | 3/2003 |
| JP | 3099101 U | 10/2003 |
| JP | 2004-230261 A | 8/2004 |
| JP | 2005-54215 A | 3/2005 |
| JP | 2005-177603 A | 7/2005 |
| JP | 2005177603 A | 7/2005 |
| JP | 2009-118892 A | 6/2009 |
| KR | 20-0287583 Y1 | 8/2002 |
| KR | 20-2010-0008548 U | 8/2010 |
| KR | 10-0981585 B1 | 9/2010 |
| KR | 10-2011-0061819 A | 6/2011 |
| WO | 2008/038853 A1 | 4/2008 |

\* cited by examiner (a)          (b)

ELECTROLYSIS DEVICE INTEGRATING RECTIFIER

CROSS-REFERENCE TO RELATED APPLICATIONS

This application is the U.S. national phase of International Patent Application No. PCT/KR2011/009112 filed Nov. 28, 2011, which claims the benefit of Korean Patent Application No. 10-2010-0132335 filed Dec. 22, 2010, the entire content of which is incorporated herein by reference.

FIELD OF THE INVENTION

Embodiments relate to an electrolysis device for treating ballast water, waste water, or sewage, or for generating sterilized water.

BACKGROUND

Conventionally, ballast water or impurity-containing water are treated by electrolysis, i.e., using an electrolytic reaction which is caused when water passes through a electrolytic cell of an electrolysis device and the water comes into contact with electrode plates inside the electrolytic cell.

The conventional electrolysis device for electrolyzing water is connected to a rectifier, which is installed at a certain distance from the electrolysis device, via a cable and a bus bar.

When a cable is used as a connection medium for connecting the electrolysis device and the rectifier, as the cable increases in length, electrical resistance also increases. This results in considerable power loss in the cable.

Since the electrolysis device and the rectifier are separately installed, a space saving efficiency is low and there is a restriction in where the electrolysis device can be installed.

In an electrolysis device that is used in a large space, for example, on land, the apparatus is relatively free from restriction in terms of the installation space, and compensation for the power loss, which is likely to occur across the cable, is relatively easy to achieve. The apparatus is used without being restricted in terms of the installation place and power loss.

On the other hand, in an electrolysis device for use in a small space, for example, on a ship, since available space and power are limited, the space and power required for the apparatus need to be efficiently used.

In an electrolysis device for electrolyzing water, impurities which were not filtered out when water is introduced into the electrolytic cell, or various kinds of salts that are byproducts of an electrolysis reaction, are likely to stick to electrodes.

The impurities sticking to the electrodes cause damage to the electrodes and become a factor of lowering efficiency of sterilizing polluted water. Polarities of the electrodes need to be changed to remove the sticking impurities.

The polarities of the electrodes in the conventional electrolysis device are determined and changed by a circuit in the rectifier.

The invention has been made keeping in mind the above problems occurring in the related art, and is intended to provide an electrolysis device with a rectifier in which the electrolysis device and the rectifier are integrally formed to eliminate the cost of cable and power loss occurring across the cable.

The invention also provides an electrolysis device with a rectifier in which the electrolysis device and the rectifier are integrally formed to efficiently fit into a small space, for example, on a ship.

The invention also provides an electrolysis device with a rectifier that achieves switching between polarities of electrodes in a simple manner by using a bus bar.

An embodiment provides an electrolysis device with a rectifier which treats water, the electrolysis device comprising: an electrolytic cell with an introduction hole and a discharge hole formed at opposing ends, respectively; a joint panel with a first surface joined to a first side surface of the electrolytic cell; an electrode module comprising a housing, a plurality of electrodes provided inside the housing, and an auxiliary panel having a first surface which is joined to a second surface of the joint panel, the auxiliary panel having a first end which passes through the first side surface of the electrolytic cell and the joint panel and is installed in the electrolytic cell and a second end which perpendicularly protrudes outward from an external periphery of a second end of the housing, over the entire length of the external periphery; a rectifier module having a first side surface located outside the second end of the housing of the electrode module and a second side surface from which an electrode protrudes; an L-shaped panel having two surfaces joined to the second surface of the joint panel and any one side surface of the rectifier module, respectively; and a bus bar that connects the electrode of the electrode module to the electrode of the rectifier module.

The bus bar may comprise: a first bus bar having a first end which is in close contact with the electrode located at the second end of the housing of the electrode module and a second end which protrudes from the second side surface of the rectifier module; and a second bus bar having a first end connected to the second end of the first bus bar and a second end connected to the electrode of the rectifier module.

The electrolysis device may further comprise a bus cover joined to the second side surface of the rectifier module in a manner of surrounding the electrode of the rectifier module and the bus bar protruding from the second side surface of the rectifier module, and a heat-sinking plate joined to the first side surface of the rectifier module.

A protrusion bar and a rail may be correspondingly formed on an upper surface and a lower surface of the rectifier module, respectively, or vice versa, to guide horizontal movement of the rectifier module.

The electrolysis device may further comprise through-holes formed in the first side surface of the electrolytic cell and the joint panel, respectively so that electrode module may be inserted into the electrolytic cell, a handle which protrudes from any one side surface of the rectifier module, and an LED display window which is formed in any one side surface of the rectifier module to display any one operation state among a normal operation state, a malfunction state, and a no-power state of the rectifier module.

In the electrolysis device, switching of the polarities may be achieved by using the bus bar.

According to an embodiment, since an electrolysis device and a rectifier are unified into a body, it is possible to eliminate a cost of cable and to prevent power loss occurring across the cable.

The electrolysis device allows space saving and easy switching of polarities of electrodes. Furthermore, the electrolysis device is easy to use.

Moreover, since an electrolytic cell and the rectifier are configured as a closed structure, the electrolysis device may be advantageous in terms of designing a waterproof and explosion-proof structure.

DETAILED DESCRIPTION

The invention will be described in detail with reference to embodiments and the accompanying drawings.

Figure 1:
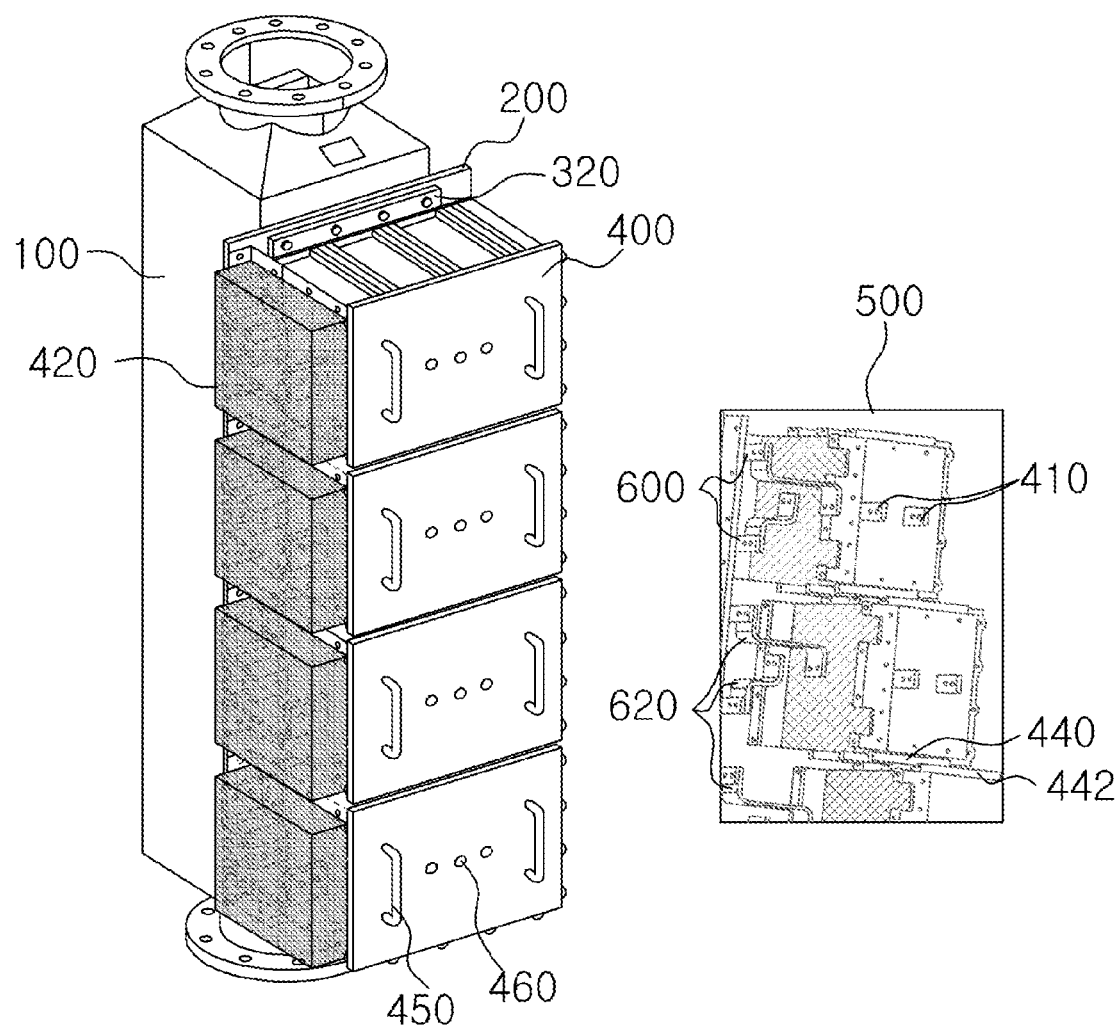
FIGS. 1 to 3 are perspective views illustrating an electrolysis device with a rectifier according to an embodiment of the invention.
Figure 2:
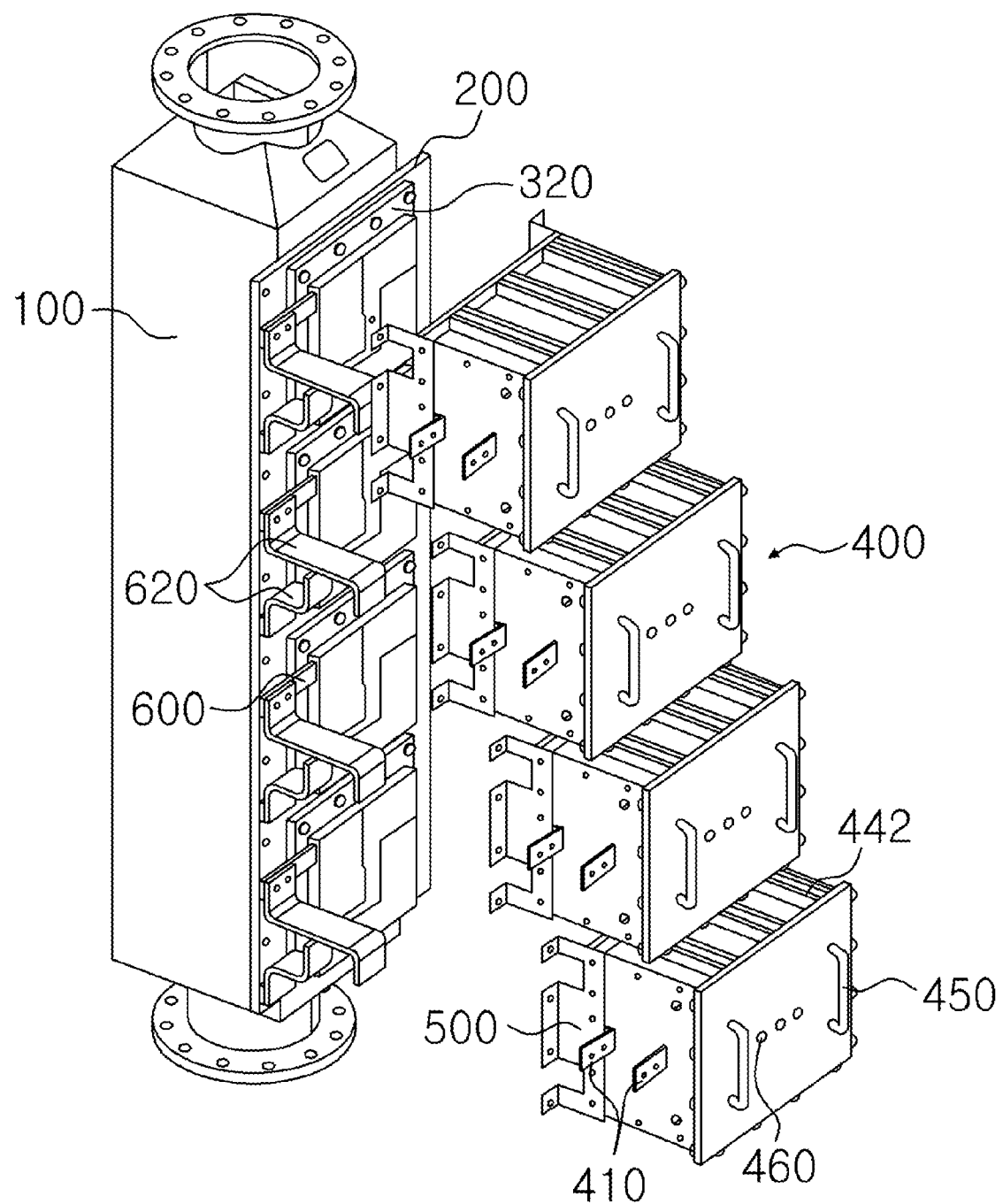
Figure 3:
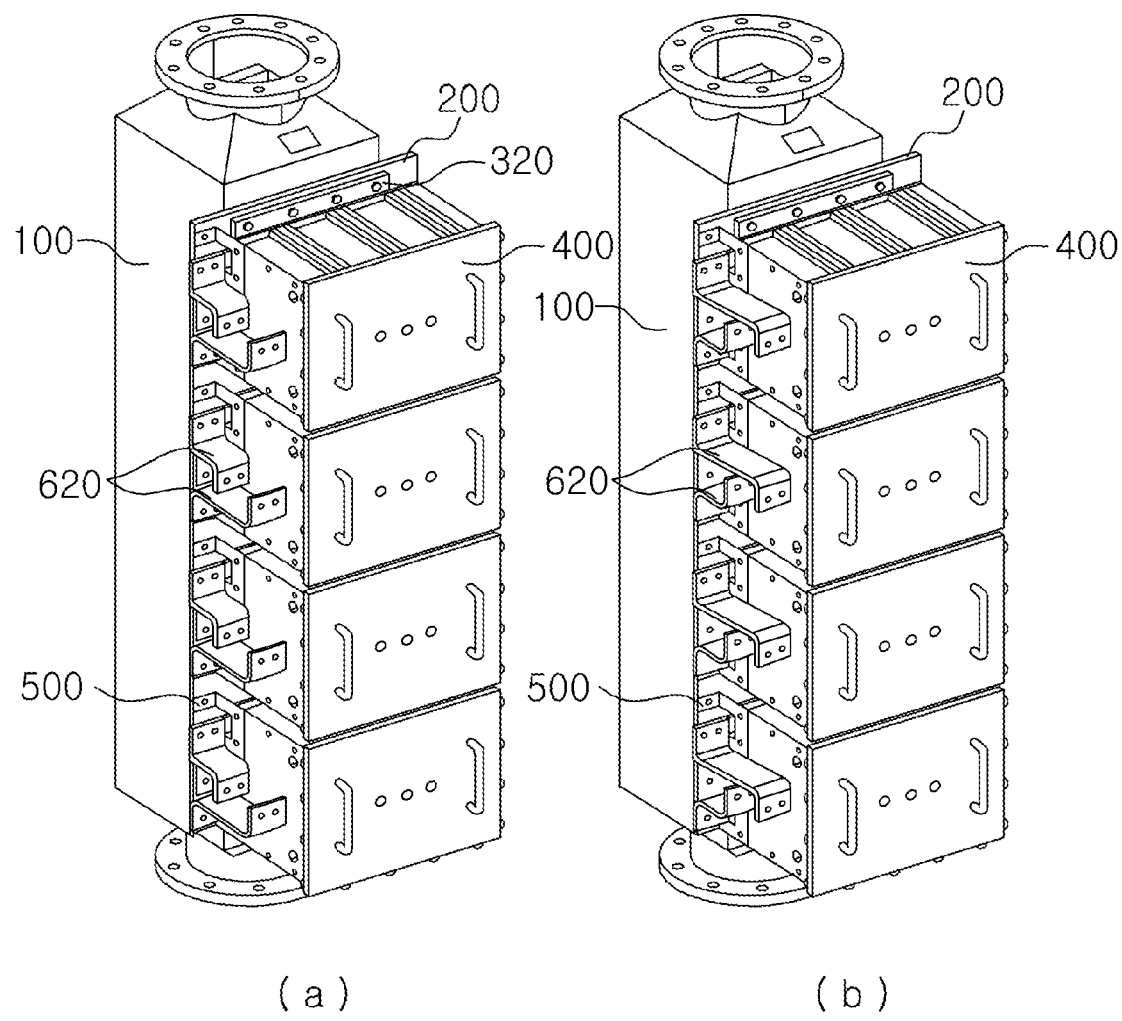

FIGS. 1 to 3 are perspective views illustrating an electrolysis device with a rectifier according to an embodiment of the invention. FIG. 1 is an enlarged perspective view and FIG. 2 illustrates a connection relation between upper and lower rectifier modules 400. FIGS. 3(a) and 3(b) illustrate an operation in which switching of polarities is achieved by using a bus bar.

Figure 4:
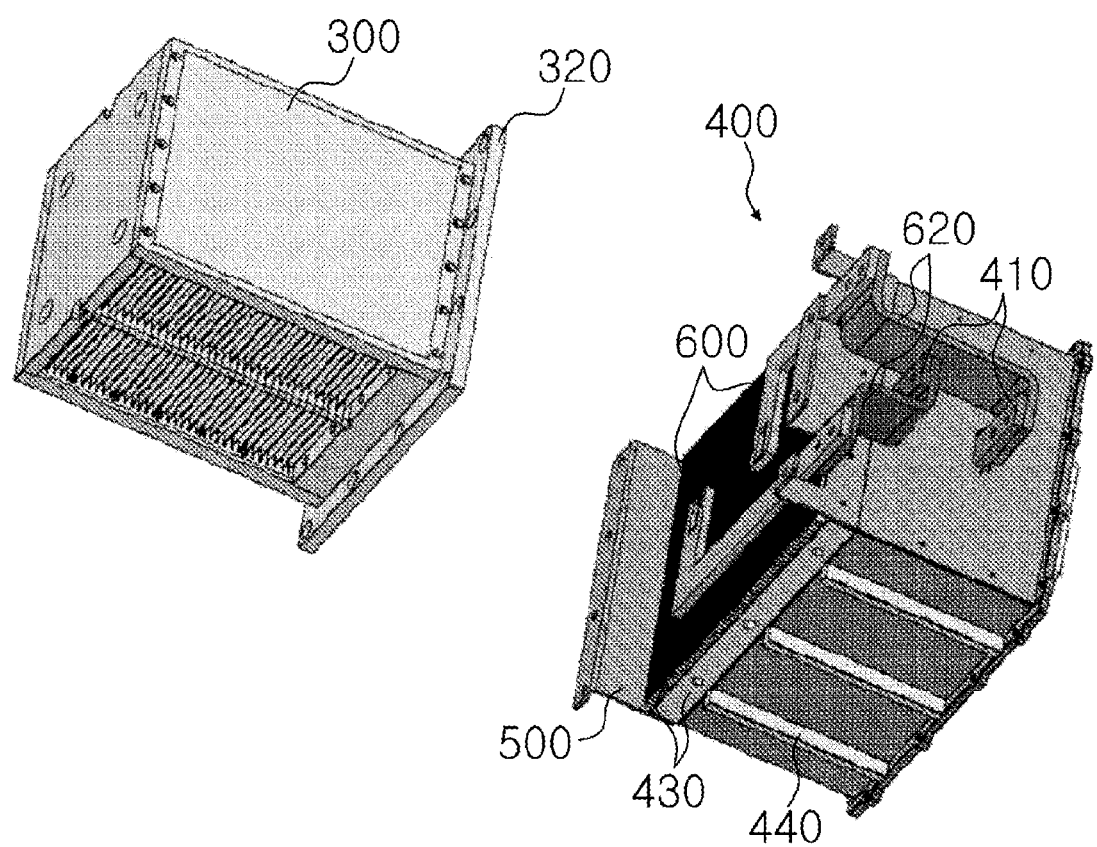
FIGS. 4 to 5 are perspective views illustrating the structure of each component of an electrode module and a rectifier module in the electrolysis device with a rectifier according to the embodiment of the invention and a connection relation between the electrode module and the rectifier module.
Figure 5:
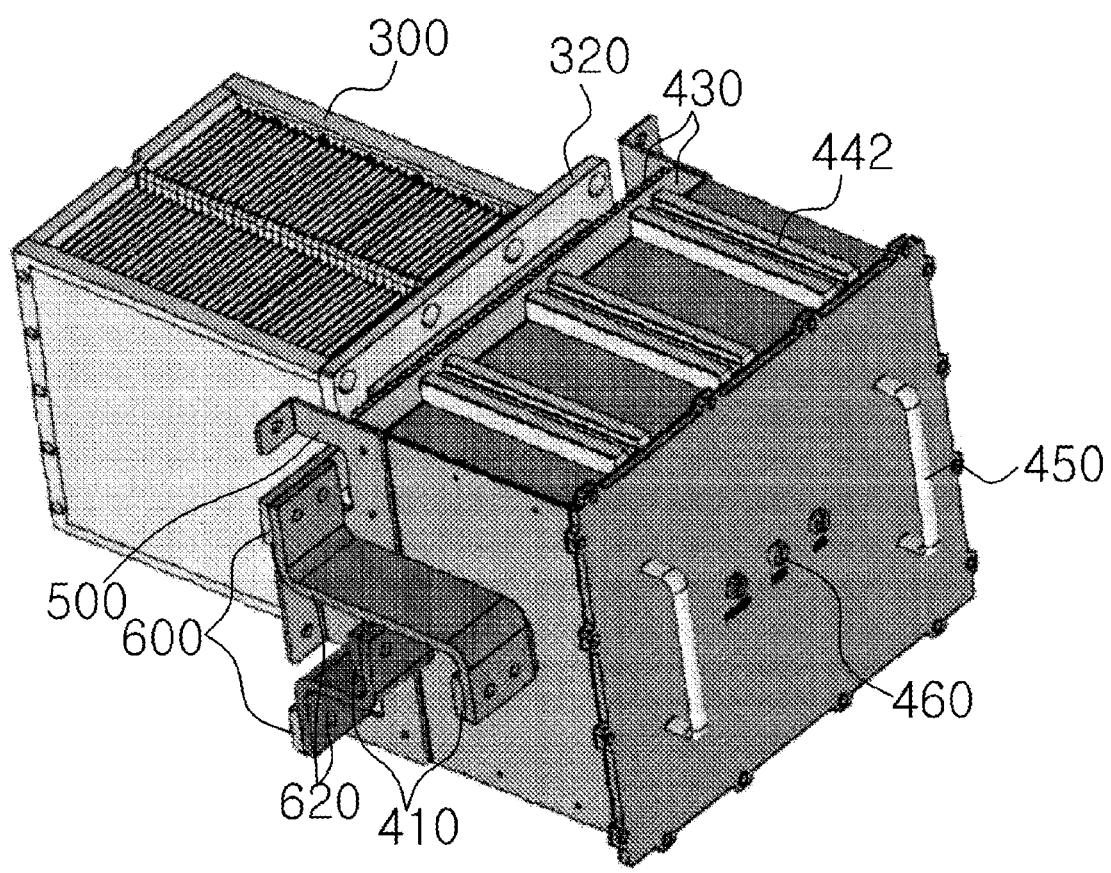

FIGS. 4 and 5 are perspective views illustrating each component of an electrode module 300 and the rectifier module 400 in the electrolysis device with a rectifier, and a connection relation between the electrode module 300 and the connection module 400. FIG. 4 is a perspective view of the electrode module 300 and the rectifier module 400 viewed from the bottom, and FIG. 5 is a perspective view of the electrode module 300 and the rectifier module 400 viewed from the top.

As illustrated in FIGS. 1 to 3, the electrolysis device with a rectifier is a water treatment apparatus and comprises an electrolytic cell 100, a joint panel 200, the electrode module 300, the rectifier module 400, and a bus bar. The electrolytic cell 100 has an introduction hole and a discharge hole at opposing ends, respectively. The joint panel 200 has a first surface joined to a first side surface of the electrolytic cell 100. The electrode module 300 comprises a housing, a plurality of electrodes provided inside the housing, and an auxiliary panel 320. The auxiliary panel 320 has a first end which passes through the first side surface of the electrolytic cell 100 and the joint panel 200 and is installed in the electrolytic cell 100, and a second end which extends over the entire length of an external periphery of a second end of the housing of the electrode module 300 and perpendicularly protrudes from the external periphery. A first surface of the auxiliary panel 320 is joined to a second surface of the joint panel 200. The rectifier module 400 has a first side surface located outside the second end of the electrode module 300 and a second side surface from which an electrode 410 protrudes. The L-shaped panel 500 has two surfaces joined to the second surface of the joint panel 200 and any one side surface of the rectifier module 400, respectively. The bus bar connects the electrode module 300 and the rectifier module 400 to each other.

The electrolytic cell 100 is a casing in which electrolysis is performed. The electrolytic cell 100 has the introduction hole through which water as a treatment target is introduced and the discharge hole through which sterilized water, which has undergone water treatment, is discharged to the outside.

The first surface of the joint panel 200 is joined to the first side surface of the electrolytic cell 100 by welding or bolt-screwing, and serves as a coupling means for joining the rectifier module 400 to the electrolytic cell 100.

The electrode module 300 includes the auxiliary panel 320. In regard to the auxiliary panel 320, the first end passes through the first side surface of the electrolytic cell 100 and the joint panel 200 and is installed inside the electrolytic cell 100, and the second end of the auxiliary panel 320 extends along the external periphery of the second end of the housing of the electrode module 300 and protrudes outward from the external periphery. The first surface of the auxiliary panel 320 is joined to the second surface of the joint panel 200. The electrode module 300 encloses the plurality of electrodes.

As shown in FIG. 4, the auxiliary panel 320 protrudes outward from the external periphery of the second end of the housing of the electrode module 300. The auxiliary panel 320 may be formed by attaching a separate member to the external periphery of the housing of the electrode module 300.

In addition, although not illustrated, the first side surface of the electrolytic cell 100 and the joint panel 200 may have a through hole to allow the electrode module 300 to be inserted into the electrolytic cell 100 therethrough.

The surface of the auxiliary panel 320 and the surface of the joint panel 200 which face each other are joined to each other using a coupling means such as a bolt. In this way, the electrode module 300 is joined to the electrolytic cell 100. In this case, a gasket of an elastic material such as rubber may be installed between the auxiliary panel 320 and the joint panel 200 to provide hermetic sealing, so that leakage of water in the electrolytic cell 100 may be prevented.

As an example of the electrodes, a plurality of electrode plates serving as an anode and a plurality of electrode plates serving as a cathode are arrayed in parallel to each other. The plurality of electrodes are provided in the electrolytic cell to sterilize water by causing oxidation/reduction reactions.

The rectifier module 400 is installed in such a manner that one side surface of the rectifier module 400 is disposed near the external surface at the second end of the electrode module 300 and electrodes 410 of the anode and cathode protrude from one of the other side surfaces of the rectifier module 400.

One or more rectifier modules 400 may be joined to one surface of the electrolytic cell 100.

In regard to the rectifier module 400, according to the preferred embodiment, four rectifier modules 400, each weighting 35 Kg or less and having performance of 13 V and 1300 A, may be attached to one surface of the electrolytic cell 100 weighting 220 kg.

The rectifier module 400 is joined to the electrolytic cell 100 using the L-shaped panel 500, respective side surfaces of which are joined to the second surface of the joint panel 200 and any one side surface of the rectifier module by coupling means such as a bolt.

An elastic member such as a gasket is installed between the L-shaped panel 500 and the rectifier module 400 and between the L-shaped panel 500 and the electrode module 300 in order to remove gaps and to provide hermetic sealing between the electrolytic cell 19 and the rectifier module 400.

As illustrated in FIG. 1, two L-shaped panels 500 may be symmetrically provided on left and right sides, respectively. A C-shaped notch may be formed at an end portion of the L-shaped panel 500 to allow the bus bar to pass through.

A heat-sinking plate 430 may be provided on one side surface of the rectifier module 400.

The heat-sinking plate 430 dissipates heat from the rectifier module 400. So, there is no need to install an additional cooling pipe in the rectifier.

In FIG. 1, the heat-dissipating plate 430 is disposed so as to face the electrode module 300.

Protrusion bars 440 are formed on either upper surface or lower surface of the rectifier module 400 and rails 442 are formed on the other surface of the upper surface and the lower surface of the rectifier module 440. Each protrusion bar 440 and each rail 442 are formed at corresponding positions in order to guide horizontal movement of the rectifier module 440.

When installing and maintaining the rectifier module 400, the electrolytic cell 100 and the rectifier module 400 can be easily disassembled and reassembled.

As illustrated in FIGS. 4 and 5, the protrusion bars 440 and the rails 442 are linearly formed to extend across the upper and lower surfaces of the rectifier module 400, respectively.

In order to achieve easy installation and maintenance of the rectifier module 400, handles 450 may be provided on any one side surface of the rectifier module 400. An LED display window 460 for displaying an operation state (for example, a normal operation state, a malfunction state, and a no-power state) of the rectifier module 400 may be further provided on any one surface of the rectifier module 400.

For the sake of convenience of handling the rectifier module 400, the positions of the handles 450 are aligned with the positions of the protrusion bars 440 and the rails 442, and the handles 450 may be configured to have sufficient strength in terms of the weight of the rectifier module 400.

The bus bar is a conductor which allows transmission of positive and negative currents and connects electrodes of the electrode module 300 and electrodes of the rectifier module 400.

When connecting the electrodes of the electrode module 300 and the electrodes of the rectifier module 400, the electrodes of the same polarity are connected to each other. That is, a positive electrode of the electrode module 300 is connected to a positive electrode of the rectifier module 400 and a negative electrode of the electrode module 300 is connected to a negative electrode of the rectifier module 400.

The bus bar may comprise a first bus bar 600 in which a first end of the first bus bar 600 is in close contact with the electrode which is located at the second end of the electrode module 300 and a second end of the first bus bar 600 protrudes from the second side surface of the rectifier module 400, and a second bus bar 620 in which a first end of the second bus bar 620 is connected to the second end of the first bus bar 600 and a second end of the second bus bar 620 is connected to the electrode 410 of the rectifier module 400.

The electrode located at the second end of the electrode module 300 may be an electrode connected to the plurality of electrodes provided inside the electrode module 300.

As illustrated in FIG. 4, the first bus bar 600 may be orthogonally bent to form an L-shape and the second bus bar 620 may be orthogonally bent two times to form a Z-shape.

Since an electric current of a high voltage flows through the electrode 410 of the rectifier module 400 and the bus bar, a bus cover 420 may be joined to the second side surface of the rectifier module 400 in a manner to surround the electrode 410 of the rectifier module 400 and the bus bar protruding from the second side surface of the rectifier module 400.

The bus cover 420 is illustrated in FIG. 1 and may be jointed to the rectifier module 400 by using a bolt.

Polarity switching in the electrolysis device is performed by using the bus bar.

As illustrated in FIGS. 3(a) and 3(b), the bus cover 420 is removed first, and then connection of the ends of the second bus bar 620 is changed in such a manner that the second end of the second bus bar 620 is connected to the electrode 410 of the rectifier module 400. In this way, the polarity switching is achieved.

Although embodiments of the invention have been disclosed for illustrative purposes, those skilled in the art will appreciate that various modifications, additions and substitutions are possible, without departing from the scope and spirit of the invention as disclosed in the accompanying claims.

DESCRIPTION OF THE REFERENCE
NUMERALS IN THE DRAWINGS

100: Electrolytic cell
200: Joint panel
300: Electrode module
320: Auxiliary panel
400: Rectifier module
410: Electrode
420: Bus cover
430: Heat-sinking plate
440: Protruding bar
442: Rail
450: Handle
460: LED display window
500: L-shaped panel
600: First bus bar
620: Second bus bar

The invention claimed is:

1. An electrolysis device with a rectifier for treating water, comprising:
   an electrolytic cell with an introduction hole and a discharge hole formed at opposing ends, respectively;
   a joint panel with a first surface joined to a first side surface of the electrolytic cell;
   an electrode module comprising a housing, a plurality of electrodes provided inside the housing, and an auxiliary panel having a first surface which is joined to a second surface of the joint panel, the electrode module having a first end which passes through the first side surface of the electrolytic cell and the joint panel and is inserted into and installed in the electrolytic cell and a second end which perpendicularly protrudes outward from an external periphery of a second end of the housing of the electrode module, over the entire length of the external periphery;
   a rectifier module having a first side surface located outside the second end of the housing of the electrode module and a second side surface from which a rectifier electrode protrudes;
   an L-shaped panel having two surfaces joined to the second surface of the joint panel and any one side surface of the rectifier module, respectively; and
   a bus bar that connects one of the plurality of electrodes of the electrode module to the rectifier electrode of the rectifier module.

2. The electrolysis device with a rectifier according to claim 1, wherein the bus bar comprises:
   a first bus bar having a first end which is in close contact with one of the plurality of electrodes located at the second end of the housing of the electrode module and a second end which protrudes from the second side surface of the rectifier module; and
   a second bus bar having a first end connected to the second end of the first bus bar and a second end connected to the rectifier electrode of the rectifier module.

3. The electrolysis device with a rectifier according to claim 2, wherein the first bus bar has a letter "L" shape and the second bus bar has a letter "Z" shape.

4. The electrolysis device with a rectifier according to claim 1, further comprising a bus cover joined to the second side surface of the rectifier module in a manner of surrounding the rectifier electrode of the rectifier module and the bus bar protruding from the second side surface of the rectifier module.

5. The electrolysis device with a rectifier according to claim 1, further comprising a heat-sinking plate joined with one side surface of the rectifier module.

6. The electrolysis device with a rectifier according to claim 1, wherein a protrusion bar and a rail are formed on an upper surface and a lower surface of the rectifier module, respectively or vice versa, thereby guiding horizontal movement of the rectifier module.

7. The electrolysis device with a rectifier according to claim 1, wherein the first side surface of the electrolytic cell and the joint panel have a through-hole which allows the electrode module to be inserted into the electrolytic cell.

8. The electrolysis device with a rectifier according to claim 1, further comprising a handle protruding from any one side surface of the rectifier module.

9. The electrolysis device with a rectifier according to claim 1, further comprising an LED display window provided in any one side surface of the rectifier module, the LED display window displaying any one operation state among a normal operation state, a malfunction state, and a no-power state.

10. The electrolysis device with a rectifier according to claim 1, wherein switching of polarities of one of the plurality of electrodes of the electrolysis device is achieved by using the bus bar.

* * * * *